United States Patent [19]

Nishikawa et al.

[11] Patent Number: 4,706,523
[45] Date of Patent: Nov. 17, 1987

[54] AUTOMATIC TRANSMISSION WITH UPSHIFT SMOOTHING VALVE

[75] Inventors: Masao Nishikawa, Tokyo; Takashi Aoki, Fujimi; Yoshimi Sakurai, Tokyo, all of Japan

[73] Assignee: Honda Giken Kogyo Kabushiki Kaisha, Tokyo, Japan

[21] Appl. No.: 656,943

[22] Filed: Oct. 2, 1984

[30] Foreign Application Priority Data

Oct. 22, 1983 [JP] Japan ............... 58-163653[U]

[51] Int. Cl.$^4$ ............................................. B60K 41/06
[52] U.S. Cl. ........................................ 74/869; 74/867
[58] Field of Search .................... 74/869, 868, 867

[56] References Cited

U.S. PATENT DOCUMENTS

| | | | |
|---|---|---|---|
| 3,688,608 | 9/1972 | Leach | 74/869 |
| 3,747,439 | 7/1973 | Uozumi et al. | 74/869 |
| 4,050,332 | 9/1977 | Taga | 74/869 |
| 4,200,008 | 4/1980 | Dach | 74/869 |
| 4,309,919 | 1/1982 | Iwanaga et al. | 74/869 |
| 4,413,536 | 11/1983 | Whitney et al. | 74/869 |
| 4,476,747 | 10/1984 | Kawamoto | 74/869 |
| 4,501,174 | 2/1985 | Sugano | 74/869 |
| 4,532,829 | 8/1985 | Sugano | 74/867 X |

FOREIGN PATENT DOCUMENTS

| | | | |
|---|---|---|---|
| 2624573 | 12/1976 | Fed. Rep. of Germany | 74/869 |
| 48-21368 | 6/1973 | Japan | |
| 48-20655 | 6/1973 | Japan | |

Primary Examiner—Leslie Braun
Assistant Examiner—Martin G. Belisario
Attorney, Agent, or Firm—Lyon & Lyon

[57] ABSTRACT

An automatic transmission has lower side and higher side friction engagement devices, with the lower side one being engaged and the higher side one being disengaged when a lower speed stage is engaged, while the lower side one is disengaged and the higher side one is engaged when the speed stage one higher than that lower speed stage is engaged. A control device for the transmission includes a shift valve for switching actuating fluid pressure between the lower side and the higher side friction engagement device and for draining the other one thereof, to provide the lower or the higher speed stage. An upshift smoothing valve is interposed in the drain path for the lower side friction engagement device for providing a higher flow resistance when a value representing engine output is relatively high and for providing a lower flow resistance when the value representing engine output is relatively low. Thus upshifting shock is reduced, particularly under low engine output conditions, in which overlapping of the engagement of the lower side and the higher side friction engagement devices is reduced. Optionally, the upshift smoothing valve may provide its higher or lower flow resistance, according as to whether the value representing engine output prevails over the actuating pressure for the higher stage friction engagement device, in a relationship between them, or not.

1 Claim, 4 Drawing Figures

AUTOMATIC TRANSMISSION WITH UPSHIFT SMOOTHING VALVE

BACKGROUND OF THE INVENTION

The present invention relates to an automatic transmission, and more particularly relates to an automatic transmission in which a means is provided for reducing shift shock upon upshifting.

In an automatic transmission in which, in order to upshift from a certain lower speed stage to a speed stage one higher, a lower side friction engagement device is disengaged substantially simultaneously as a higher side friction engagement device is engaged, providing good mutual timing for this engagement and disengagement is very important. If the lower side friction engagement device is disengaged too early relative to the engagement of the higher side friction engagement device, then the rotational speed of the engine coupled to the transmission increases suddenly, and then as the higher side friction engagement device is subsequently engaged a troublesome shifting shock can be caused, and also the friction engagement devices and other parts of the transmission can be unduly deteriorated. On the other hand, if the lower side friction engagement device is disengaged too late relative to the engagement of the higher side friction engagement device, then the consequent overlapping of the engagement of the two friction engagement devices causes the transmission to be substantially engaged in two different speed stages at the same time; and this may cause at least temporary locking up of the transmission, leading to unpleasant shifting shock, and also can severely damage the members of the transmission such as the friction engagement devices.

In order to control this mutual timing of the simultaneous disengagement and engagement of the lower and higher side friction engagement devices, in Japanese Patent Publications Nos. 48-20655, 48-21368, and 49-40585 there has been proposed the concept of variably controlling the flow resistance of the drain path which is provided from the lower side friction engagement device according to the actuating fluid pressure that is being supplied to the higher side friction engagement device. In such a construction, when the actuating pressure of the higher side friction engagement device rises above a certain level, so that said higher side friction engagement device is engaged to a certain degree, the lower side friction engagement device is quickly drained so as to disengage it. However, although this concept is helpful, upshifting shock still occurs in the case that the upshifting is being made with the throttle opening relatively low, as for example if a shift-up occurs when the vehicle has been moved off from rest suddenly and then the accelerator pedal has been substantially released. This is because, if the throttle opening is high, much slipping of the friction engagement devices is caused by high engine torque during upshifting, and so the aforementioned effective establishment of two different speed stages at the same time during the transitory period of overlapping of the engagement of the two friction engagement devices is not so noticeable; but this masking effect of slippage is not available when the engine torque is low. In extreme cases at low throttle opening, the shock may be so great as to give the impression that the braking system of the vehicle has been suddenly applied, and needless to say this can cause severe transmission damage over a period of time.

SUMMARY OF THE INVENTION

The present invention stems from the realization by the present inventors that in these circumstances of low engine output the need for overlapping of the engagement of the lower and higher side friction engagement devices is in any case less, because low engine torque means that the tendency for the revolution speed of the engine and the driving members of the friction engagement devices to rise sharply during upshifting is much less.

Accordingly, it is the primary object of the present invention to provide a transmission control device, which provides good upshifting without shifting shock.

It is a further object of the present invention to provide such a transmission control device, which provides good and shockless upshifting during all conditions of engine output, particularly low engine output.

It is a further object of the present invention to provide such a transmission control device, which reduces the overlapping between the engagements of a lower side and a higher side friction engagement device, when engine output is low.

It is a yet further object of the present invention to provide such a transmission control device, which is simple in structure.

It is a yet further object of the present invention to provide such a transmission control device, which provides good durability for the transmission.

According to the most general aspect of the present invention, these and other objects are accomplished by, for an automatic transmission comprising a gear transmission mechanism comprising a lower side hydraulic fluid pressure actuated friction engagement device and a higher side hydraulic fluid pressure actuated friction engagement device, said lower side friction engagement device being engaged and said higher side friction engagement device being disengaged when a certain lower speed stage of said transmission is engaged, and said lower side friction engagement device being disengaged and said higher side friction engagement device being engaged when a certain higher speed stage one higher than said lower speed stage of said transmission is engaged: a transmission control device, comprising: (a) a means for selectively either supplying actuating fluid pressure to said lower side friction engagement device and draining said higher side friction engagement device, to provide said lower speed stage, or for draining said lower side friction engagement device through a certain drain path and supplying actuating fluid pressure to said higher side friction engagement device, to provide said higher speed stage; and (b) a means, interposed in said certain drain path for said lower side friction engagement device, for providing a higher flow resistance when a value representing engine output is relatively high and for providing a lower flow resistance when said value representing engine output is relatively low.

According to such a structure, when the engine output is relatively high, the variable flow resistance means provides a high flow resistance, and thereby the lower side friction engagement device is drained relatively slowly during upshifting, thus giving greater overlapping between the engagements of the lower side and the higher side friction engagement devices, so as to prevent sudden revolution speed increase. On the other hand, when the engine output is relatively low, the variable flow resistance means provides a low flow resistance, and thereby the lower side friction engagement device is drained relatively quickly during upshifting, thus giving a much lesser overlapping between the engagements of the lower side and the higher side friction engagement devices, in order to prevent upshifting shock. Accordingly this transmission control device provides good upshifting at all engine output levels.

BRIEF DESCRIPTION OF THE DRAWINGS

The present invention will now be shown and described with reference to the preferred embodiments thereof, and with reference to the illustrative drawings, which are given purely for the purposes of explanation only, and are none of them intended to be limitative of the scope of the present invention. In the description, spatial terms are used in the sense of the relevant figure throughout, except where otherwise stated, and in the drawings.

DESCRIPTION OF THE PREFERRED EMBODIMENTS

Figure 1:
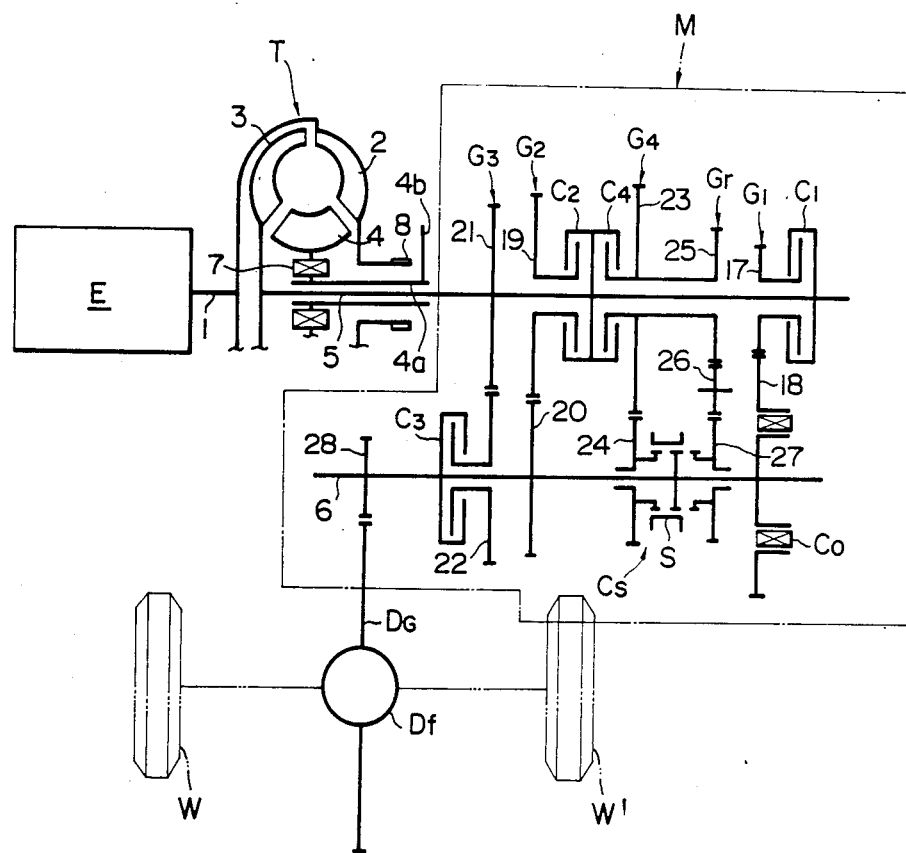
FIG. 1 is a skeleton view, in part block diagrammatical form, of the power train of a vehicle incorporating an automatic transmission which is a preferred embodiment of the present invention.

FIG. 1 schematically shows the power train of a vehicle incorporating a preferred embodiment of the present invention, and particularly shows in skeleton form a gear transmission mechanism M comprised in said preferred embodiment; this figure is applicable to both the first and the second embodiments described herein. Referring to this figure, an engine E drives wheels W, W' of the vehicle via, in order, a torque converter T, said gear transmission mechanism M, and a differential device Df.

Specifically, the crankshaft 1 of the engine E is connected to a pump impeller 2 of the torque converter T. This torque converter T further comprises a turbine driven member 3 fixedly mounted on the left hand end of a power input shaft 5 of the gear transmission mechanism M, and a stator member 4 mounted, via a one-way clutch 7, on the left hand end of a hollow stator shaft 4a. The casing (not shown) of this torque converter T is filled with hydraulic fluid, and torque is transmitted and amplified between the pump impeller 2 and the turbine driven member 3 by circulation of this hydraulic fluid, reaction being taken by the stator member 4. The stator shaft 4a is freely rotatably fitted over said power input shaft 5, and on its right hand end is fixed a stator arm 4b, the free end of which is free to move through a certain small distance so as to actuate a regulator valve Vr shown in FIG. 2 although this is not specifically shown. And to a mounting shaft of the pump impeller 2 is fixedly attached a pump drive gear 8 for driving an oil pressure pump P shown in FIG. 2. A power output shaft 6 is supported within the casing (not shown) of the gear transmission mechanism M in parallel to the aforementioned power input shaft 5, and a power output gear wheel 28 is mounted on the left hand end of this power output shaft 6 for transmitting output power to a differential gear Dg of the differential device Df meshed with it, from which the wheels W, W' are driven.

Between the power input shaft 5 and the parallel power output shaft 6 there are provided five gear trains G1, G2, G3, G4, and Gr, which are selectively engagable, by the selective engagement of friction engagement means C1, C2, C3, and C4 and of a dog clutch Cs, so as to selectively transfer rotational power from the input shaft 5 to the output shaft 6 at various gearing ratios. These means C1 through C4 and Cs are controlled by selective supplies of actuating pressure from a hydraulic fluid pressure control system. In more detail, the gear train G1, which is for providing the first speed stage of the gear transmission mechanism M, comprises a first speed driving gear 17 rotatably mounted on the power input shaft 5 and selectively engagable thereto by the first speed clutch C1, and a first speed driven gear 18 constantly meshed with said first speed driving gear 17 and engaged, via a one-way clutch Co, to the power output shaft 6. The sense of operation of the one-way clutch Co is such that torque can be transmitted from the crankshaft 1 of the engine E rotating in its normal rotational direction to the power output shaft 6 to drive the wheels W, W', but not in the reverse direction. The gear train G2, for providing the second speed stage, comprises a second speed driving gear 19 rotatably mounted on the power input shaft 5 and selectively rotatably engagable thereto by the second speed clutch C2, and a second speed driven gear 20 constantly meshed with said second speed driving gear 19 and fixedly mounted on the power output shaft 6. The gear train G3, for providing the third speed stage, comprises a third speed driving gear 21 fixedly mounted on the power input shaft 5 and a third speed driven gear 22 mounted on the power output shaft 6 and constantly meshed with said third speed driving gear 21 and selectively rotatably engagable thereto by the third speed clutch C3. The gear train G4, for providing the fourth speed stage, comprises a fourth speed driving gear 23 rotatably mounted on the power input shaft 5 and selectively rotatably engagable thereto by the fourth speed clutch C4, and a fourth speed driven gear 24 constantly meshed with said fourth speed driving gear 23 and rotatably mounted on the power output shaft 6 and selectively engagable thereto via the dog clutch Cs, when the sleeve S thereof is shifted to the left. And the gear train Gr, for providing the reverse speed stage, comprises a reverse speed driving gear 25 integrally formed with the fourth speed driving gear 23 and therefore also selectively rotatably engagable to the power input shaft 5 by the fourth speed clutch C4, a reverse speed idler gear 26 constantly meshed with said reverse speed driving gear 25, and a reverse speed driven gear 27 constantly meshed with said reverse speed idler gear 26 and rotatably mounted on the power output shaft 6 and selectively engagable thereto via the dog clutch Cs, when the sleeve S thereof is shifted to the right.

Thus, when the first speed stage is to be provided, only the first speed clutch C1 is supplied with actuating pressure to engage it, and the sleeve S of the dog clutch Cs is kept shifted leftwards. In this state, the rotation of the power input shaft 5 is transmitted via the clutch C1 and the first speed driving and driven gears 17 and 18, i.e. through the first speed stage gear train G1, to the power output shaft 6, and is then transmitted therefrom via the gears 28 and Dg and the differential device Df to the wheels W, W' of the vehicle, at a gearing ratio appropriate to the first speed stage. When the second speed stage is to be provided, the supply of actuating pressure to the first speed clutch C1 is continued, and additionally the second speed clutch C2 is supplied with actuating pressure, while the clutches C3 and C4 are not supplied with actuating pressure, and the sleeve S of the dog clutch Cs is still kept shifted to its leftmost position. In this state, the rotation of the power input shaft 5 is transmitted via the clutch C2 and the second speed driving and driven gears 19 and 20, i.e. through the second speed stage gear train G2, to the power output shaft 6 and thence to the wheels W, W', at a gearing ratio now appropriate to the second speed stage. Meanwhile, although the first speed clutch C1 is still kept engaged, because of the overrunning operation of the one-way clutch Co which now free wheels, no problem is caused, and a smooth upshift from the first speed stage to the second speed stage becomes possible. In fact, the first clutch C1 is kept engaged during the engagement of all the higher speed stages, because if it were disengaged, the problem might occur that dragging of the one-way clutch Co might cause the engagement members of said first clutch C1 to constantly be moving relative to one another, which could cause undesirable wear on these engagement members and thus could cause damage to the first clutch C1 by the generation of heat therein.

Further, when the third speed stage is to be provided, the supply of actuating pressure to the first speed clutch C1 is continued, and additionally the third speed clutch C3 is now supplied with pressure to engage it, while the supply of actuating pressure to the second speed clutch C2 is now ceased and also the fourth speed clutch C4 is still not supplied with actuating pressure, and the sleeve S of the dog clutch Cs is still kept shifted to its leftmost position. Now, the rotation of the power input shaft 5 is transmitted via the third speed driving and driven gears 21 and 22 and the clutch C3, i.e. via the third speed stage gear train G3, to the power output shaft 6 and thence to the wheels W, W', at a gearing ratio now appropriate to the third speed stage. Again, the one-way clutch Co now free wheels. Yet further, when the fourth speed stage is to be provided, the supply of actuating pressure to the first speed clutch C1 is continued, and additionally the fourth speed clutch C4 is now supplied with pressure to engage it, while the supply of actuating pressure to the third speed clutch C3 is now ceased and also now the second speed clutch C2 is still not supplied with actuating pressure, and the sleeve S of the dog clutch Cs is still kept shifted to its leftmost position. In this state, the rotation of the power input shaft 5 is transmitted via the clutch C4 and the fourth speed driving and driven gears 23 and 24, i.e. via the fourth speed stage gear train G4, to the power output shaft 6 and thence to the wheels W, W', at a gearing ratio now appropriate to the fourth speed stage. Again, the one-way clutch Co now free wheels. When the gear transmission mechanism M is to be set to the neutral state, then none of the clutches C1 through C4 is supplied with actuating pressure, and in this state no rotational power transfer is available between the power input shaft 5 and the power output shaft 6. Finally, when the reverse speed stage is to be provided, from the neutral state described above first the sleeve S of the dog clutch Cs is shifted to its rightmost position, and then only the fourth speed clutch C4 is supplied with pressure to engage it, while no actuating pressure is supplied to the other clutches C1 through C3. In this state, the rotation of the power input shaft 5 is transmitted via the clutch C4, the reverse speed driving gear 25, the reverse idler gear 26, and the reverse speed driven gear 27 and the dog clutch Cs, i.e. via the reverse speed stage gear train Gr, to the power output shaft 6 and thence to the wheels W, W', at a gearing ratio appropriate to the reverse speed stage, and now in the reverse rotational direction, due to the additional interposition of the reverse idler gear 26. At this time, the first speed clutch C1 must not be engaged.

Figure 2:
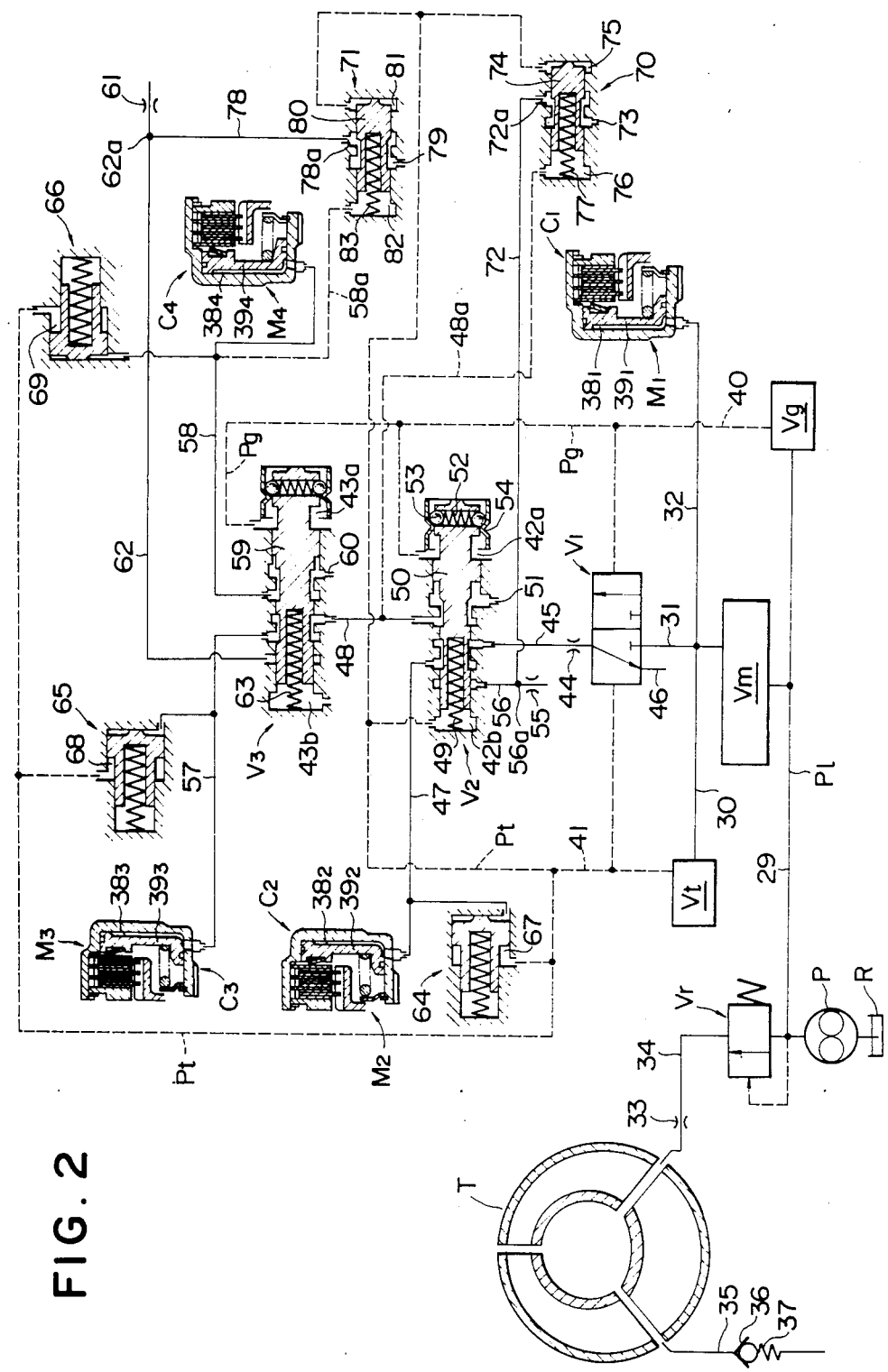
FIG. 2 is a detailed hydraulic fluid pressure circuit diagram of a control device incorporated in a preferred embodiment of the automatic transmission of the present invention.

Now the structure and operation of the hydraulic fluid pressure control system shown in FIG. 2 for the gear transmission mechanism M, incorporated in the first preferred embodiment of the present invention, will be explained. This control system comprises a hydraulic fluid reservoir R, a pump P, a line pressure regulator valve Vr, a manual range setting valve Vm, a governor pressure regulation valve Vg, a throttle pressure regulation valve Vt, and three speed shifting valves V1, V2, and V3. FIG. 2 also shows the torque converter T and portions of the four clutches C1 through C4 described above.

The pump P sucks up hydraulic fluid from the reservoir R and supplies it under pressure to the conduit 29. The line pressure regulator valve Vr vents some of this fluid so as to regulate the pressure in the conduit 29 to a line pressure Pl, which is then supplied to the manual range setting valve Vm, and to the governor valve Vg. The vented hydraulic fluid is expelled from the line pressure regulator valve Vr via a conduit 34 and a throttle 33 to the interior of the torque converter T for preventing cavitation therein. The pressure maintained inside the torque converter T is determined by the flow resistance of the throttle 33 and by the force of the spring 37 of a check valve 36 provided in a drain path 35 for the torque converter which leads to the oil reservoir R.

The manual range setting valve Vm, which is per se conventional comprises a valve element not shown in the figures which can be positioned by the use of a manual transmission lever (also not shown) to any one of various positions indicating desired transmission ranges, such as a reverse range position, a neutral range position, a drive range position, and so on. The operation of this manual range setting valve Vm will not be described herein except insofar as it is relevant to the present invention; suffice it to say that when the manual range setting valve Vm is set to its neutral range position the line pressure Pl which is supplied to it via the conduit 29 is not supplied from it to anywhere, while on the other hand when said manual range setting valve Vm is set to the drive range position (for forward vehicle operation using all four forward speeds) the line pressure Pl which is supplied to it is supplied from it to conduits 30, 31, and 32 which respectively conduct said line pressure Pl to a throttle valve Vt, to a first-second speed shift valve V1, and to a hydraulic actuator M1 for the first speed clutch C1. In this last connection, each of the four clutches C1 through C4 for the four forward speed stages, explained above, is equipped with a respective hydraulic actuator M1 through M4, and these actuators have respective annular pressure chambers $38_1$ through $38_4$ and respective annular pistons $39_1$ through $39_4$. When hydraulic fluid pressure is supplied to any one of these annular pressure chambers $38_1$ through $38_4$, then pressure in said pressure chamber impels the respective annular piston $39_1$ through $39_4$ to compress friction engagement elements and to cause the respective clutch C1 through C4 to be engaged.

The per se known governor valve Vg comprises a member which is driven at a rotational speed proportional to vehicle road speed by a gear, not particularly shown, engaged with the power output shaft 6 or with the drive gear Dg of the differential device Df. Line pressure Pl is supplied through the conduit 29 to a port of the governor valve Vg. In a pe se well known manner, by a feedback process, the value of the pressure Pg, i.e. of the governor pressure, available at an output port of the governor valve Vg and fed therefrom to a conduit 40 is caused to be substantially proportional to the speed of rotation of the governor valve Vg, i.e. to vehicle road speed. Also the line pressure Pl is supplied via the conduit 30 to the per se known throttle valve Vt. This throttle valve Vt provides, in a conduit 41, an output pressure signal, i.e. the throttle pressure Pt, which is controlled according to the depression of a throttle pedal, not shown, of the vehicle to which this transmission system is fitted, and is thus indicative of engine output.

Three shifting valves V1, V2, and V3 are provided for controlling the shifting of the transmission between, respectively, the first and second speed stages, the second and third speed stages, and the third and fourth speed stages. Each of these valves comprises a valve element which reciprocates in a bore formed in a housing; the constructional details of the first-second speed shifting valve V1 are not particularly shown because they are not directly relevant to the present invention, while the valve elements of the second-third speed shifting valve V2 and the third fourth speed shifting valve V3 are respectively denoted by the reference numerals 50 and 59. The governor pressure Pg produced by the governor valve Vg is transmitted through the conduit 40 and branches therefrom to a pressure chamber, not shown, at the right end of the bore of the first second speed shifting valve V1, and also to respective pressure chambers 42a and 43a defined at the right ends of the valve elements 50 and 59 in the bores of the valves V2 and V3 respectively. And the throttle pressure Pt produced by the throttle valve Vt is transmitted through the conduit 41 and branches therefrom to a pressure chamber, not shown, at the left end of the bore of the first-second speed shifting valve V1, and also to respective pressure chambers 42b and 43b defined at the left ends of the valve elements 50 and 59 in the bores of the valves V2 and V3 respectively.

In the first-second speed shifting valve V1, its valve element is biased rightwards by a spring (not shown), and further in the pressure chambers 42b and 43b of the second-third speed shifting valve V2 and the third-fourth speed shifting valve V3 are respectively provided compression coil springs 49 and 63 which similarly bias their respective valve elements 50 and 59 rightwards. In the valves V2 and V3, per se known detent mechanisms are respectively provided. This detent mechanism comprises a pair of balls 53 mounted in a diametrically extending passage in the valve element 50 and biased radially outwards by a compression coil spring 52 mounted between them and two projections 54 over which these balls 53 must ride if the valve element 50 is to move leftwards from its position shown in the drawing. Similar detent arrangements are provided for the third-fourth speed shifting valve V3, but its parts are not specifically designated by any reference numerals; and in fact a similar detent arrangement, not shown, is also provided for the first-second speed shifting valve V1. Thus, each of the valve elements of the speed shifting valves V1, V2, and V3 is positioned, under the modifying influence of the relevant aforesaid detent mechanism, according to the preponderance between a leftwards force applied by the governor pressure Pg in the right side pressure chamber of said valve which is representative of vehicle road speed, and the sum of said spring biasing force and a rightwards force applied by the throttle pressure Pt in the left side pressure chamber of said valve which is representative of engine output. Thus, when the vehicle is at rest and governor pressure Pg is substantially zero, the valve elements of the speed shifting valves V1, V2, and V3 are positioned rightwards in their bores by the biasing actions of the springs 49 and 63. Further, as per se conventional, the forces of the biasing springs 49 and 63 and the areas of the ends of the valve elements are so arranged that, as the governor pressure Pg gradually increases relative to the throttle pressure Pt, first the valve element of the first-second speed shifting valve V1 moves leftwards; then later the valve element 50 of the second-third speed shifting valve V2 moves leftwards; and only last, later, does the valve element 59 of the third-fourth speed shifting valve V3 move leftwards. And, similarly, as the governor pressure Pg gradually decreases relative to the throttle pressure Pt, this upshifting order is repeated in reverse for downshifting.

Thus, when the throttle pedal is applied while the vehicle is at rest with the transmission in drive range, line pressure Pl is supplied from the manual range setting valve Vm through the conduit 32 to the pressure chamber $38_1$ of the first clutch C1, but none of the other clutches C2 through C4 are engaged because (vide infra) the conduit 31 is discommunicated by the first-second speed shifting valve V1 from a conduit 45 which is instead communicated to a drain conduit 46, so that first speed stage is provided by the gear transmission mechanism M by the first speed gear train G1 being engaged. And, as the throttle pedal is depressed, the vehicle moves away from rest in the first speed stage, and thus governor pressure Pg starts to increase.

When the difference between this governor pressure Pg and the throttle pressure Pt increases beyond a certain value, then the valve element of this valve V1 moves leftwards against the action of the biasing spring thereof after overcoming the action of the detent mechanism. In this operational state, the line pressure Pl present in the conduit 31 is conducted, via ports of the first-second speed shifting valve V1 which are now communicated together and via a throttle element 44, to a conduit 45, instead of this conduit 45 being drained through the drain conduit 46 as was formerly the case. This line pressure thus reaches the second-third speed shifting valve V2 and, since the valve element 50 thereof is still in the rightwards shifted position, is conducted through ports which are presently communicated together to a conduit 47 which leads it to the pressure chamber $38_2$ of the second clutch C2 to engage it. An accumulator 64 is provided for cushioning the engagement shock of this second clutch C2, and its cushioning effect is regulated by the throttle pressure Pt, which is conducted to its pressure chamber 67 via a branch from the conduit 41, in a per se known way. Thus, the second speed gear train G2 is engaged, with both the first and second clutches C1 and C2 engaged, and with the other clutches C3 and C4 disengaged.

When governor pressure Pg continues to increase as road speed increases, and the difference between this governor pressure Pg and the throttle pressure Pt becomes greater than another certain value, then the valve element of this valve V2 moves leftwards against the action of the biasing spring 49 thereof after overcoming the action of the detent mechanism. In this operational state, the line pressure Pl present in the conduit 45 is conducted through ports of the second-third speed shifting valve V2 which are now communicated together to a conduit 48 which was formerly drained via a drain port 51, while the conduit 47 is now drained via ports of the valve V2 which are now communicated together and via the conduit 56 as will be more particularly explained later, so that the second clutch C2 is disengaged. This line pressure in the conduit 48 is led to the third-fourth speed shifting valve V3 and, since the valve element 59 thereof is still in the rightwards shifted position, is conducted through ports of said valve V3 which are presently communicated together to a conduit 57 which leads it to the pressure chamber $38_3$ of the third clutch C3 to engage it. An accumulator 65 is provided for cushioning the engagement shock of this third clutch C3, and again its cushioning effect is regulated by the throttle pressure Pt, which is conducted to its pressure chamber 68 via a branch from the conduit 41. Thus, the third speed gear train G3 is engaged, with both the first and third clutches C1 and C3 engaged, and with the other clutches C2 and C4 disengaged.

When the governor pressure Pg continues to increase further as road speed further increases, and when the difference between this governor pressure Pg and the throttle pressure Pt rises to be higher than yet another certain value, then the valve element of this valve V3 moves leftwards against the action of the biasing spring 63 thereof after overcoming the action of the detent mechanism. In this operational state, the line pressure Pl present in the conduit 48 is now no longer supplied to the conduit 57 and therefrom to the pressure chamber $38_3$ of the third clutch C3, but instead this conduit 57 is drained via ports of the valve V3 which are now communicated together and via the conduit 62 as will be more particularly explained later, so that the third clutch C3 is disengaged. And instead the line pressure Pl present in the conduit 48 is conducted through ports of said valve V3 which are now communicated together to a conduit 58, which is now disconnected from a drain passage 60 to which it was formerly connected, to the pressure chamber $38_4$ of the fourth clutch C4 to engage it. An accumulator 66 is provided for cushioning the engagement shock of this fourth clutch C4, and again its cushioning effect is regulated by the throttle pressure Pt, which is conducted to its pressure chamber 69 via a branch from the conduit 41. Thus, the fourth speed gear train G4 is engaged, with both the first and fourth clutches C1 and C4 engaged, and with the other clutches C2 and C3 disengaged.

During the reverse process, i.e. when the vehicle is being slowed down from a high road speed with the transmission engaged to the fourth speed stage, the above described transitions occur in the reverse order and direction to those explained above.

Particularly according to an application of the inventive concept of the present invention, the conduit 56—through which, after passing through the second - third speed stage shifting valve V2, hydraulic fluid from the pressure chamber $38_2$ of the second speed stage clutch C2 is drained during an upshift from the second speed stage to the third speed stage—is communicated to drain (i.e. to the hydraulic fluid reservoir R) via a variable flow resistance construction. In detail, this conduit 56 leads to a branch point 56a, from which a throttling element 55 leads hydraulic fluid to the reservoir R with a certain flow resistance being interposed, and from which also a branch conduit 72 leads hydraulic fluid to an inlet port 72a of an upshift smoothing valve 70. This smoothing valve 70 comprises a valve element 74 which reciprocates in a bore formed in a housing, and the valve element 74 is biased leftwards by the throttle pressure Pt which is supplied via a conduit branched from the conduit 41 to a chamber 75 defined at the right end of said valve bore, while it is biased rightwards by the operating pressure present in the conduit 48 and being supplied to the pressure chamber $38_3$ of the third clutch C3 which is supplied via a conduit 48a branched from said conduit 48 to a chamber 76 defined at the left end of said valve bore, as well as by the action of a compression coil spring 77 mounted in said chamber 76. When the valve element 74 is in its rightwards position as shown in the drawing, then it communicates the port 72a to a drain port 73, and thereby the flow resistance to drain from the conduit 56 offered by this construction (including the throttling element 55) as a whole is relatively low, because the throttling element 55 is substantially bypassed. On the other hand, when the valve element 74 of the valve 70 is in its leftwards position in its bore, then it discommunicates said port 72a from the drain port 73, and thus the flow resistance to drain from the conduit 56 offered by this construction (including the throttling element 55) as a whole is relatively high.

Similarly, the conduit 62—through which, after passing through the third-fourth speed stage shifting valve V3, hydraulic fluid from the pressure chamber $38_3$ of the third speed stage clutch C3 is drained during an upshift from the third speed stage to the fourth speed stage—is communicated to drain (i.e. to the hydraulic fluid reservoir R) via a variable flow resistance construction. In detail, this conduit 62 leads to a branch point 62a, from which a throttling element 61 leads hydraulic fluid to the reservoir R with a certain flow resistance being interposed, and from which also a branch conduit 78 leads hydraulic fluid to an inlet port 78a of another upshift smoothing valve 71. This smoothing valve 71 comprises a valve element 80 which reciprocates in a bore formed in a housing, and the valve element 80 is biased leftwards by the throttle pressure Pt which is supplied via another conduit branched from the conduit 41 to a chamber 81 defined at the right end of said valve bore, while it is biased rightwards by the operating pressure present in the conduit 58 and being supplied to the pressure chamber $38_4$ of the fourth clutch C4 which is supplied via a conduit 58a brnached from said conduit 58 to a chamber 82 defined at the left end of said valve bore, as well as by the action of a compression coil spring 83 mounted in said chamber 82. When the valve element 80 is in its rightwards position as shown in the drawing, then it communicates the port 78a to a drain port 79, and thereby the flow resistance to drain from the conduit 62 offered by this construction (including the throttle element 61) as a whole is relatively low, because the throttling element 61 is substantially bypassed. On the other hand, when the valve element 80 of the valve 71 is in its leftwards position in its bore, then it discommunicates said port 78a from the drain port 79, and thus the flow resistance to drain from the conduit 62 offered by this construction (including the throttling element 61) as a whole is relatively high.

The upshift smoothing valve 70 for the second to third speed upshift functions as follows. First suppose that the transmission is in its second speed stage, with the valve elements of the speed shift valves V1, V2, and V3 respectively in their leftwardly, rightwardly, and rightwardly shifted positions, and with the second speed clutch C2 engaged while the third speed clutch C3 is disengaged by draining of the pressure in its pressure chamber $38_3$ via the conduit 57, the valve V3, the conduit 48, and the drain port 51 of the valve V2 communicated thereto. Then suppose that the governor pressure Pg now prevails over the throttle pressure Pt in its action on the valve element 50 of the second-third speed stage shifting valve V2, so that as explained previously said valve element 50 of the valve V2 shifts to its leftward position in the valve bore thereof. As earlier explained, this causes line pressure P1 to be now supplied to the pressure chamber $38_3$ of the third speed clutch C3 via the conduit 44, the valve V2 which is now switched, the conduit 48, the valve V3, and the conduit 57, so that the pressure in said pressure chamber $38_3$ starts progressively to rise, and thus the third speed clutch C3 starts to be progressively engaged. At the same time, the pressure chamber $38_2$ of the second speed clutch C2 now starts to be drained of actuating hydraulic fluid via the conduit 47, the valve V2 which is now switched, the conduit 56, and the aforementioned variable flow resistance draining construction comprising the throttling element 55 and the upshift smoothing valve 70. Now, if the action of the throttle pressure Pt prevails in its biasing action on the valve element 74 over the action of the spring force of the spring 77 and the operating pressure of the third clutch C3 (present in the conduit 48 and transmitted to the chamber 76 of the valve 70), then as explained above the port 72a of said valve 70 is discommunicated from its drain port 73 by its valve element 74, and hence the flow resistance to drain from the conduit 56 is high (being equal to the resistance of the throttling element 55), so that the second clutch C2 is relatively slowly disengaged. This is appropriate, because if the value of the throttle pressure Pt is relatively high there is a need for overlapping of the engagements of the second speed clutch C2 and of the third speed clutch C3 during shifting from the second speed stage to the third speed stage, in order to prevent the engine E racing and unduly raising the revolution speed of the power input shaft 5 and of the driving member of the third speed clutch C3, which could cause transmission shock and excessive wear on the clutches. On the other hand, if the throttle pressure Pt does not prevail in its biasing action on the valve element 74 over the action of the spring force of the spring 77 and the operating pressure of the third clutch C3, then as explained above the port 72a of the valve 70 is communicated to its drain port 73, and hence the flow resistance to drain from the conduit 56 is low, with the throttling element 55 being bypassed by the upshift smoothing valve 70, so that the second clutch C2 is relatively quickly disengaged. This is again appropriate, because if the value of the throttle pressure Pt is relatively low there is no substantial likelihood of the engine E racing and unduly raising the revolution speed of the power input shaft 5 and of the driving member of the third speed clutch C3, even if the overlapping of the engagements of the second speed clutch C2 and of the third speed clutch C3 is reduced.

The other upshift smoothing valve 71 operates in exactly the same way as described above for altering the amount of overlapping of the engagements of the third speed clutch C3 and the fourth speed clutch C4 in the case of an upshift from third to fourth, and produces the same beneficial results.

This quicker disengagement during upshifting of the clutch of the lower speed stage (the second speed stage in the detailed description above) relative to the engagement of the higher speed stage (the third speed stage in the description), when engine output is lower, is very effective for minimizing transmission shock in the upshifting process in the case that the throttle opening is low, in which as discussed earlier some unpleasant shock was caused in the prior art. In the shown first preferred embodiment, this basic inventive concept is further refined by the combination thereto of the concept of slowing down the disengagement of the clutch of the lower speed stage when the engagement pressure of the higher speed stage clutch is higher, and according to this the valve element 74 of the upshift smoothing valve 70 is moved in its direction to discommunicate the ports 72a and 73 by the throttle pressure Pt, while it is moved in its direction to communicate the ports 72a and 73 by the operating pressure of the clutch C3 for the higher speed stage conducted from the conduit 48 via a conduit 48a. Thus, this concept functions in synergy with the present basic concept of slowing the lower speed stage clutch disengagement when engine output is low, to give a particularly improved form of transmission shifting that is remarkably comfortable and free from shift shock. As will be easily understood, the operating pressure for the higher speed stage, the third speed stage in the detailed description above, may be supplied to the second-third upshift smoothing valve 70 from some other point of the system, rather than the conduit 48; for instance, it could be taken from the conduit 45 or the conduit 57. Equally, the operating pressure for the fourth speed stage may be supplied to the third-fourth upshift smoothing valve 71 from some other point of the system, rather than the conduit 58; for instance, it could be taken from the conduit 45 or the conduit 48.

Figure 3:
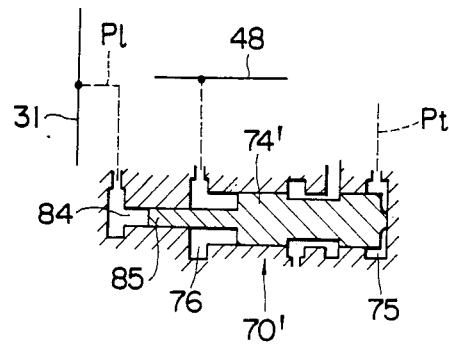
FIG. 3 is a longitudinal sectional diagram, similar to a portion of FIG. 1, showing an essential portion of a control device incorporated in another preferred embodiment of the automatic transmission of the present invention.

In FIG. 3, an essential portion of the transmission control device incorporated in another preferred embodiment of the automatic transmission of the present invention is shown. In this embodiment, rather than the spring 77 being used for biasing the valve element 74' of the second-third upshift smoothing valve 70', a projecting portion 85 of said valve element 74' extends into a subsidiary bore thereof, at the end of which a biasing pressure chamber 84 is defined. The line pressure Pl is supplied to this biasing chamber 84, and accordingly pressure therein biases the valve element 74' rightwards, thus fulfilling the role of the spring 77 of the first preferred embodiment shown. This concept of course could also be applied to the third-fourth upshift smoothing valve 71.

Figure 4:
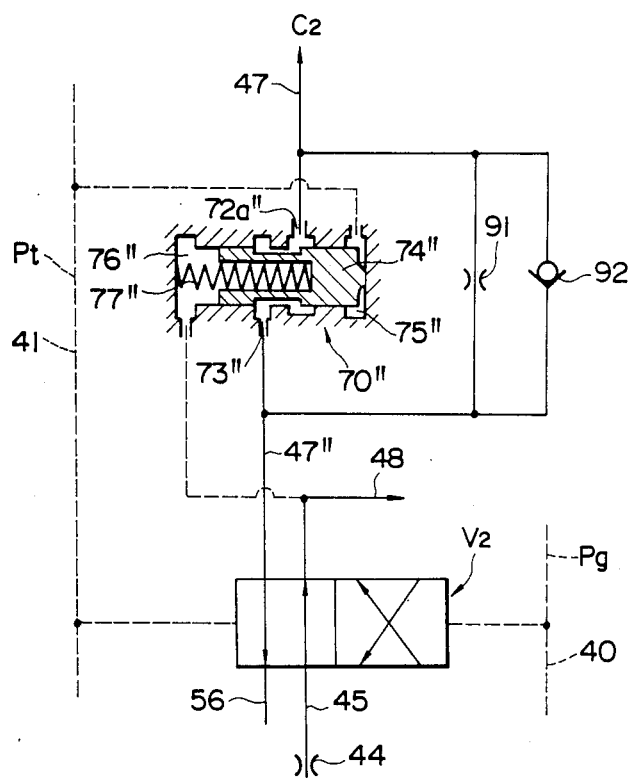
FIG. 4 is a partial view of a hydraulic pressure circuit diagram of a control device for yet another embodiment of the automatic transmission of this invention.

In FIG. 4, an essential portion of the transmission control device incorporated in yet another preferred embodiment of the automatic transmission of the present invention is shown. In this embodiment, the variable flow resistance construction is located in the hydraulic fluid transmission path 47 between the second clutch C2 and the valve V2, instead of being located downstream of said valve V2 in the drain path of said clutch C2. The valve 70" functions in the same way as in the first preferred embodiment described above, and parts of it which correspond to parts of the valve 70 of the first embodiment shown in FIG. 2 are denoted in FIG. 4 by the same reference numerals with two primes affixed, but however in addition a throttling element 91 and a one-way valve 92 are both connected in parallel with said valve 70". The provision of the one-way valve 92, which allows flow of fluid only from the second - third speed shifting valve V2 towards the second clutch C2 and not in the reverse direction, is in order to ensure that this variable flow resistance construction only functions to interfere with draining of the pressure chamber $38_2$ of the second clutch C2, and does not interfere with filling of said pressure chamber $38_2$.

The shown embodiments of the present invention used clutches as friction engagement elements, but this invention is also applicable to an automatic transmission utilizing planetary gear trains with bands as friction engagement elements. Other modifications may be conceived of. Therefore, while the invention has been particularly shown and described with reference to several preferred embodiments thereof, it will be understood by those skilled in the art that various changes in form and details may be made to any of the foregoing embodiments without departing from the spirit and scope of the invention.

What is claimed is:

1. A transmission control an automatic transmission comprising the mechanical transmission mechanism comprising a lower side hydraulic fluid pressure actuated friction engagement device and a higher side hydraulic fluid pressure actuated friction engagement device, said lower side friction engagement device being engaged and said higher side friction engagement device being disengaged when a certain lower speed stage of said transmission is engaged, and said lower side friction engagement device being disengaged and said higher side friction engagement device being engaged when a certain higher speed stage one higher than said lower speed stage of said transmission is engaged; a transmission control device, comprising;

(a) a two position valve means for selectively supplying actuating fluid pressure either to said lower side friction engagement device and draining said higher side friction engagement device to provide said lower speed stage, or for draining said lower side friction engagement device through a certain drain path and supplying actuating fluid pressure to said higher side friction engagement device to provide said higher speed stage;

(b) said certain drain path extending from said lower side friction engagement device to and through said two position valve means;

(c) output means for supplying a throttle pressure corresponding to the power output of an engine to which the transmission is connected;

(d) a variable flow resistance control valve means interposed in said certain drain path between said two position valve means and said lower side friction engagement device and connected to said output means for providing a higher flow resistance when the engine output is relatively high and for providing a lower flow resistance when the engine output is relatively low; and (e) a one-way valve and an orifice bypass provided in parallel with each other and with said variable flow resistance control valve means, said one-way valve allowing substantially free flow of fluid from said two position valve means towards said lower side friction engagement device, but not in the reverse direction.

* * * * *